United States Patent
Lupsa et al.

(10) Patent No.: US 10,992,121 B2
(45) Date of Patent: Apr. 27, 2021

(54) ADJUSTABLE MOUNTING LUG FOR ELECTRICAL BOX

(71) Applicant: ABB Schweiz AG, Baden (CH)

(72) Inventors: Ioan Lupsa, Dollard-des-Ormeaux (CA); Daniel Lalancette, Saint-Jean-sur-Richelieu (CA)

(73) Assignee: ABB Schweiz AG, Baden (CH)

( * ) Notice: Subject to any disclaimer, the term of this patent is extended or adjusted under 35 U.S.C. 154(b) by 101 days.

(21) Appl. No.: 16/456,309

(22) Filed: Jun. 28, 2019

(65) Prior Publication Data
US 2020/0412116 A1  Dec. 31, 2020

(51) Int. Cl.
*H02G 3/12* (2006.01)
*H02G 3/08* (2006.01)

(52) U.S. Cl.
CPC ............. *H02G 3/126* (2013.01); *H02G 3/085* (2013.01)

(58) Field of Classification Search
CPC .......... H02G 3/126; H02G 3/12; H02G 3/121; H02G 3/123; H02G 3/10; H02G 3/085
See application file for complete search history.

(56) References Cited

U.S. PATENT DOCUMENTS

| | | | | |
|---|---|---|---|---|
| 4,523,355 A | * | 6/1985 | Rosa | H01B 17/06 24/115 N |
| 8,076,578 B1 | * | 12/2011 | Gretz | H02G 3/126 174/57 |
| 2018/0363807 A1 | * | 12/2018 | Lupsa | F16B 7/044 |

FOREIGN PATENT DOCUMENTS

| | | |
|---|---|---|
| GB | 800174 A | 8/1958 |
| GB | 1180394 A | 2/1970 |
| GB | 1182468 A | 2/1970 |
| GB | 1205597 A | 9/1970 |
| GB | 2050713 B | 1/1983 |
| GB | 2183107 A | 5/1987 |
| GB | 2257847 A | 1/1993 |
| GB | 2257846 B | 1/1995 |
| GB | 2310762 B | 10/2000 |
| GB | 2399463 A | 9/2004 |

(Continued)

OTHER PUBLICATIONS

Alfanar, Switch Boxes Junction Boxes, product manual, 12 pp.
(Continued)

*Primary Examiner* — Timothy J Thompson
*Assistant Examiner* — Amol H Patel
(74) *Attorney, Agent, or Firm* — Taft Stettinius & Hollister LLP

(57) ABSTRACT

An adjustable mounting lug for an electrical box that diminishes the degree of play of the adjustable mounting lug relative to at least an orientation of a front face of the electrical box. Sidewalls of the adjustable mounting lug can include a first portion comprising a first segment, and a second portion comprising a first inclined side, an intermediate curved side, and a second inclined side. The second portion can be configured accommodate the adjustable mounting lug having a relatively large height while maintaining at least a minimum length of a bottom wall of the adjustable mounting lug that is supported by a support louvre of the electrical box. The second portion also provides the sidewalls of the larger adjustable mounting lug with a configuration that can prevent the adjustable mounting lug from interfering with at least fittings in the box that can be associated with relatively large knockout openings.

20 Claims, 6 Drawing Sheets

(56) References Cited

FOREIGN PATENT DOCUMENTS

SG            53491 G      8/1991
WO        97/32380 A1      9/1997

OTHER PUBLICATIONS

Appleby, mounting boxes, enclosures and luminaires, product manual, Mar. 2007, 20 pp.
ITCC, International Tube & Conduit Company Ltd., British Standard Steel Conduits & Fittings, product manual, 16 pp.
MK Electric Catalogue, Boxes and Ancillary Products, product manual, Jan. 2016, 7 pp.

\* cited by examiner

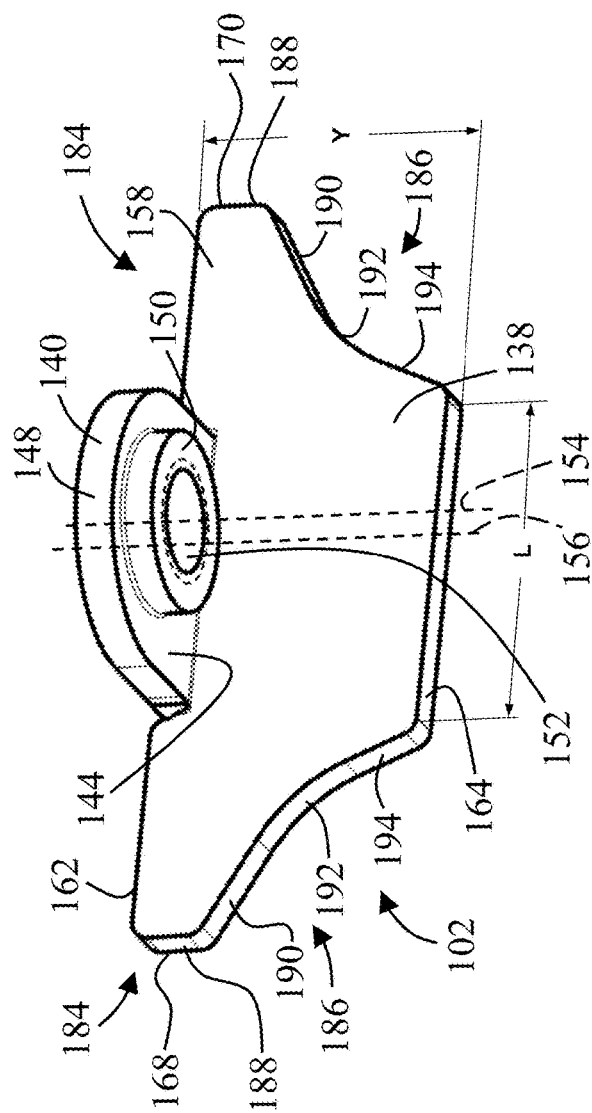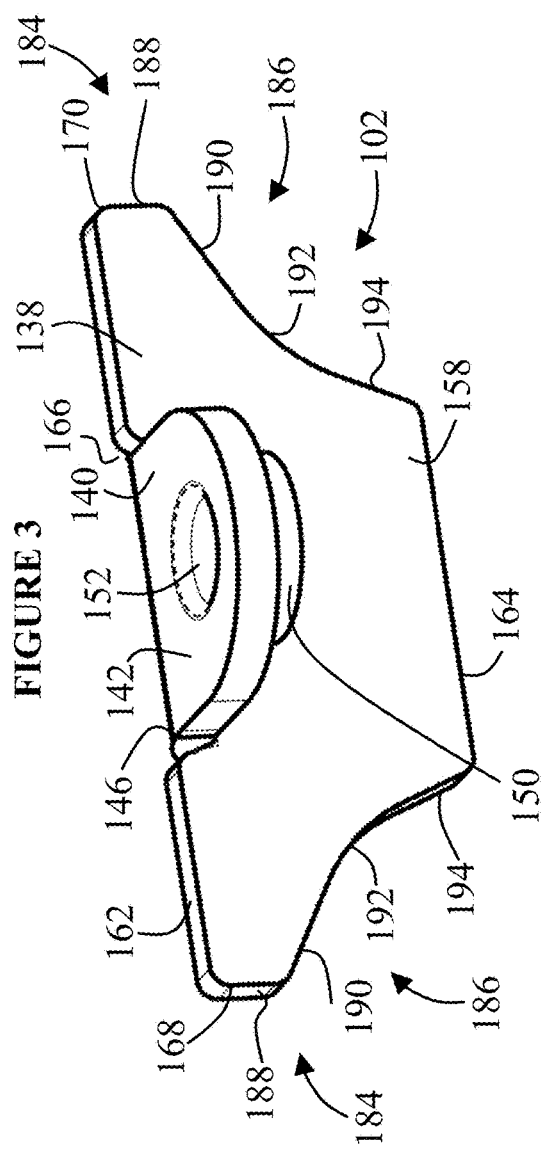

ADJUSTABLE MOUNTING LUG FOR ELECTRICAL BOX

FIELD OF INVENTION

The present invention relates to electrical boxes for housing electrical connections, and more particularly, to electrical boxes having adjustable mounting lugs that provide adjustability with respect the orientation of the electrical boxes relative to at least electrical devices that can be mounted to the electrical boxes.

BACKGROUND

Electrical boxes, also referred to as electrical outlet boxes, are typically used to connect one or more electrical devices, such as switches and receptacles, among other devices, to electrical cables or wires that may run through, or behind, a wall(s) of a structure and into the electrical box. Typically, such electrical boxes are mounted to a wall stud that may be, or will be, supporting structural wallboard. Attempts are typically made to mount the electrical box with respect to the stud and/or wall so that the so that the front face of the electrical box is in vertical alignment with the front of the wallboard that is, or will be, placed against the stud.

Occasionally, however, a mistake in the mounting of the electrical box can result in the front face of the electrical box being misaligned with the front of the wallboard. Additionally, in at least some instances, after accurate mounting of the electrical box to a stud, subsequent electrical installation relating to connecting wires or cables that are inserted into the electrical box with an electrical device(s) that is to be mounted to the electrical box can cause the box to displaced, such as, for example, pushed inwardly into a wall cavity, thereby causing the front face of the electrical box to become misaligned with the front of the wallboard.

Various attempts have been made at accommodating such situations so that the misaligned electrical box can still be utilized in a manner that maintains desired visual esthetics. Moreover, such attempts have sought to attain, through use of the misaligned electrical box, an aesthetic appearance with respect to at least an alignment of the electrical devices that are mounted to the electrical box relative to the front of the wallboard. Yet, at least some of these prior approaches cannot provide a relatively secure manner of adjustment while also accommodating relatively large knockouts, including, for example, relatively low depth electrical boxes that have knockouts having a diameter of around 25.5 millimeters (mm). Additionally, attempts to correct such misalignment have included use of mounting components of electrical boxes that have an overabundant amount of freedom, or relatively excessive degree of play, in movement. Such relatively excessive movement can result in mounting holes of the electrical box being relatively easily misaligned with the mating fasteners that are used to mount the electrical devices to the box such that, when the electrical devices are being mounted to the box, the fasteners strip the internal threads of the mounting holes.

Accordingly, although various electrical boxes are available currently in the marketplace, further improvements are possible to provide electrical boxes having ample space around a knockout for a fitting installation while also providing a stable adjustability for the relative orientation of at least electrical devices that can be mounted to the electrical box.

BRIEF SUMMARY

An aspect of an embodiment of the present application is an apparatus comprising a mounting extension having a mounting hole, and a back wall that is attached to the mounting extension. The back wall can have a top wall, a bottom wall, a first sidewall, and a second sidewall. The first and second sidewalls can extend between the top wall and the bottom wall, and can each comprise a first inclined side, an intermediate curved side, and a second inclined side. Further, the intermediate curved side can be a curved surface that is positioned between the first and second inclined side, and the first inclined side can extend along an incline that is different than an incline about which the second inclined side extends.

Another aspect of an embodiment of the subject application is an apparatus comprising a mounting extension having an upper surface, a lower surface, and a mounting hole that has an internal thread. The apparatus can further include a back wall that is attached to the mounting extension, and which can have a top wall, a bottom wall, a first sidewall, and a second sidewall. The first and second sidewalls can each have a first portion and a second portion. The first portion can comprise a first segment, and the second portion can comprise a first inclined side, an intermediate curved side, and a second inclined side. The intermediate curved side can be positioned between the first and second inclined sides. Additionally, the first inclined side can extend in a direction different than the first segment and along an incline that is different than an incline about which the second inclined side can extend.

Additionally, an aspect of an embodiment of the subject application is an apparatus comprising a mounting extension that can have a mounting hole that extends along a first central axis, and a back wall attached to the mounting extension that can extend along a second central axis that is parallel to, and offset from, the first central axis. The back wall can have a top wall, a bottom wall, a first sidewall, and a second sidewall. The first sidewall can comprise a first wing, and the second sidewall can comprise a second wing. Further, the first wing and the second wing can each have a first segment that is connected, and which is generally parallel, to the top wall, a first inclined surface that is connected to the first segment and which can extend away from the first segment at a first obtuse angle, an intermediate curved side connected to the first inclined surface and that can be inwardly curved into the back wall, and a second inclined surface that is connected to both the intermediate curved side and the bottom wall and that extends away from the bottom wall at a second obtuse angle.

These and other aspects of the present invention will be better understood in view of the drawings and following detailed description.

BRIEF DESCRIPTION OF THE DRAWINGS

The description herein makes reference to the accompanying figures wherein like reference numerals refer to like parts throughout the several views.

FIG. 3 illustrates a bottom side perspective view of a front side of an adjustable mounting lug according to an embodiment of the present application.

FIG. 4 illustrates a top side perspective view of a front side of an adjustable mounting lug according to an embodiment of the present application.

Figure 1:
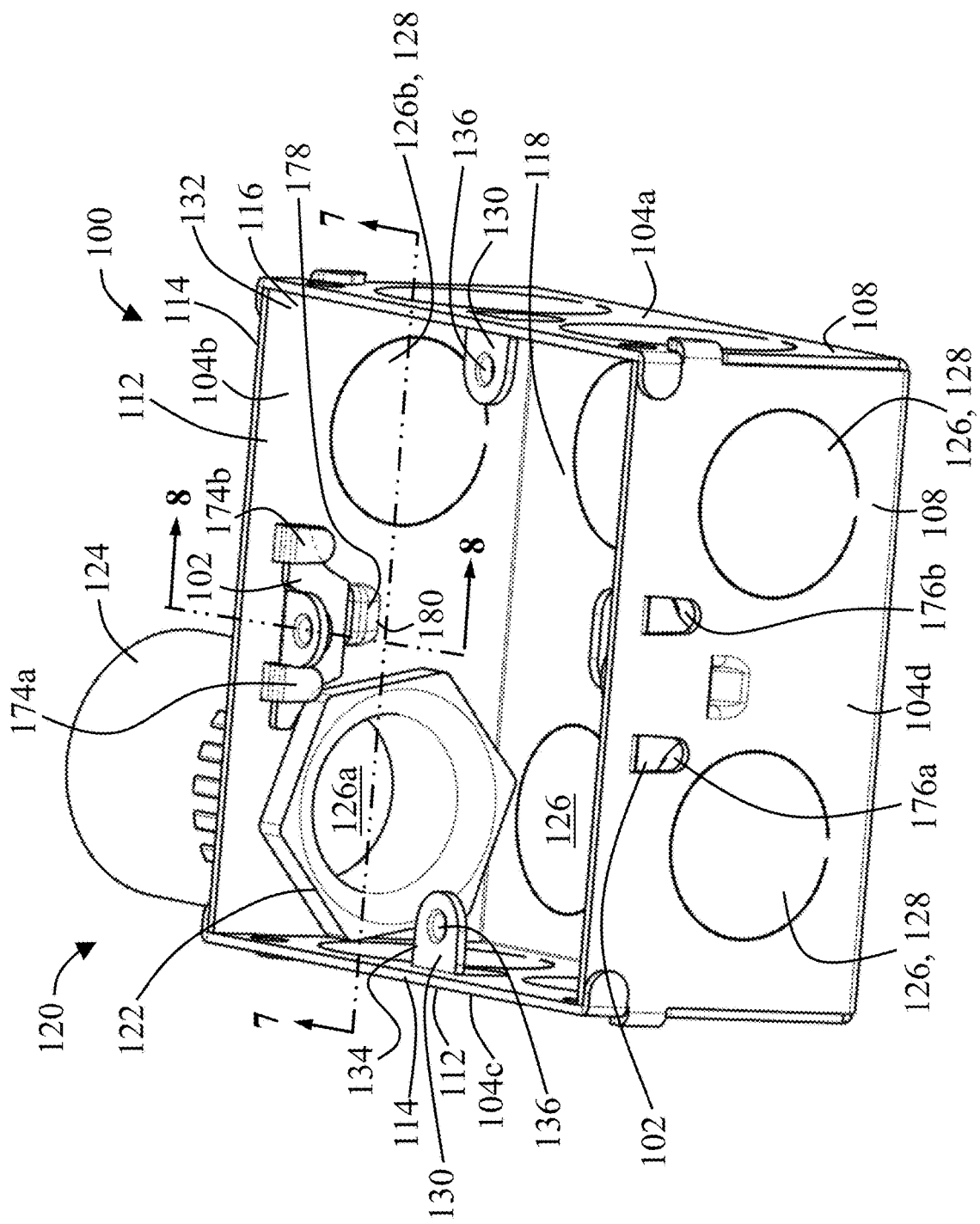
FIG. 1 illustrates a top side perspective view of an exemplary electrical box having adjustable mounting lugs according to an embodiment of the present application.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates a top side perspective view of an exemplary electrical box 100 having a plurality of adjustable mounting lugs 102 according to an embodiment of the present application. As shown, the electrical box 100 can include a plurality of sidewalls 104a-d and a bottom wall 106, the bottom wall 106 being attached to a first end 108 of each of the sidewalls 104a-d. While FIG. 1 illustrates an exemplary electrical box 100 that has four, relatively flat or straight sidewalls 104a-d that are arranged to form a generally square or rectangular shaped box, the number of sidewalls 104a-d, the shape(s) of the sidewalls 104a-d and bottom wall 106, and the arrangement of the sidewalls 104a-d can vary. Moreover, the number, shape, and/or arrangement of the sidewalls 104a-d can vary such that the electrical box 100 can have a variety of shapes and sizes, including, but not limited to, square, rectangular, hexagonal, octagonal, circular, and non-circular shapes, among other shapes. Additionally, the electrical box 100 can be constructed from a variety of different materials, including, for example, steel, plastic, PVC, and fiberglass, and can be formed, shaped, stamped, assembled, and/or molded in a variety of different manners.

Additionally, the electrical box 100 can have a variety of depths, such as, for example, from the first end 108 to a second end 110 of the sidewalls 104a-d. For example, according to certain embodiments, the electrical box 100 can be a relatively low depth electrical box, including, for example, but not limited to, electrical boxes having a depth of around 1½ inches (in.), 1⅞ inches, 2 inches, and 2⅛ inches, among other sizes. According to other embodiments, the electrical box 100 has a depth of about 35 millimeters (mm), and square configuration in which the sidewalls 104a-d each have of a length of about 72 mm. However, embodiments of the subject application are not limited to low depth electrical boxes, and can instead be applied to electrical boxes that have a range of depths and sizes.

One or more of the second ends 112 of the sidewalls 104a-d can be arranged and/or positioned to provide the electrical box 100 with a rim or front face 114 that can extend substantially, if not entirely, around a periphery of the electrical box 100 at an end of the electrical box 100 that is generally opposite to the location of the bottom wall 106. With respect to at least some installations of the electrical box 100, the front face 114 can be arranged such that, if properly installed, the front face 114 is co-planar with, or in a plane that is parallel to, a front of a wallboard that may be adjacent to the electrical box 100. For example, in at least certain installations, the front face 114 may be coplanar to, or in a plane that is parallel to, a front face of a drywall board such that the front face 114 and front of the wallboard are, depending on the installation, in vertical or horizontal alignment with each other.

The rim or front face 114 can also generally define an opening 116 to an interior region 118 of the electrical box 100. The interior region 118 can, according to at least certain embodiments, be a space or area in the electrical box 100 that is generally defined by the sidewalls 104a-d and the bottom wall 106. According to at least certain embodiments, the interior region 118 can be sized to accommodate placement of at least a portion of certain electrical devices, including, but limited to one or more switches, outlets, and plugs, among other electrical devices, as well as various combinations thereof. Additionally, the interior region 118 can also be sized to accommodate an electrical connection(s) within the interior region 118 of such electrical devices with one or more wires and/or cables, as well as placement of at least a portion of one or more fittings 120 that can be associated with such wires and cables. For example, FIG. 1 illustrates a single fitting 120 coupled to the electrical box 100 that comprises a male bushing 122 that is threadingly coupled to a nut 124. As shown, at least a portion of the male bushing 122 is positioned within the interior region 118 such that a portion of a sidewall 104b is, when the fitting 120 is assembled, positioned and/or compressed between the male bushing 122 and a portion of the nut 124.

Additionally, as shown in FIG. 1, the fitting 120 extends through one of a plurality of knockout openings 126 in the electrical box 100. The number and size of the knockout openings 126 can vary for each sidewall 104a-d, back wall 106, and/or electrical box 100. According to the illustrated embodiment, each sidewall 104a-d and the back wall 106 have two knockout openings 126, with each knockout opening 126 having a size, such as, for example, a diameter that is around 25.5 millimeters (mm), among other sizes. Further, according to certain embodiments, one or more of the sidewalls 104a-d, and/or the electrical box 100, can have different sized knockout openings 126, such as, for example, a sidewall 104b having both a first knockout opening 126a having a first size (e.g. diameter), and a second knockout opening 126b having a second size (e.g. diameter) that is smaller than the first size. Further, the electrical box 100 can be formed such that one or more knockout openings 126 are covered by a removable cover in the form of a knockout 128, such as, for example, a partially stamped portion of the sidewall 104a-d that can be selectively removable to provide access through, or otherwise uncover, the associated knock-out opening 126.

As also seen in FIG. 1, the electrical box 100 can include at least one adjustable mounting lug 102 that is coupled to a sidewall 104b, 104d in a manner that can accommodate movement of the adjustable mounting lug 102 in a plurality of directions, as discussed below. According to the illustrated embodiment, the electrical box 100 can include one pair, or set, of adjustable mounting lugs 102 and one set, or pair, of fixed mounting lugs 130. Unlike the adjustable mounting lugs 102, the fixed mounting lugs 130 are generally fixed in position, and, more specifically, are relatively static relative to at least the associated sidewall 104a, 104c, to which the fixed mounting lugs 130 are directly attached. According to certain embodiments, the fixed mounting lugs 130 can be stamped from a portion of the associated sidewall 104a, 104c such that the sidewall 104a, 104c and the fixed mounting lug 130 are part of a unitary, or monolithic, construction.

As illustrated by at least FIG. 1, according to the illustrated embodiments, the set of adjustable mounting lugs 102 are mounted on an inner side 132 of opposing sidewalls 104b, 104d that face each other, while the set of fixed mounting lugs 130 are mounted on the inner side 132 of different opposing sidewalls 104a, 104c that also face each other. Thus, according to the illustrated embodiment in which the electrical box 100 has a square or rectangular configuration, the adjustable mounting lugs 102 can be mounted on a pair of parallel sidewalls 104b, 104d, and the fixed mounting lugs 130 are mounted to a different pair of parallel sidewalls 104a, 104c. Additionally, as shown by FIG. 1, the sets of adjustable mounting lugs 102 and fixed mounting lugs 130 are positioned within the interior region 118 of the electrical box 100 and may, or may not, be in relatively close proximity to the opening 116 and/or the front face 114 of the electrical box 100. Additionally, as shown in FIG. 1, the fixed mounting lugs 130 can include an inwardly extending mounting surface 134 that can be generally perpendicular to the associated sidewall 104a, 104c, and which includes an internally threaded mounting hole 136 that is configured for threaded engagement with a fastener that can be used to mount an electrical device to the electrical box 100.

FIGS. 2-6 illustrate various views of an exemplary adjustable mounting lug 102 according to an illustrated embodiment of the present application. As shown, the adjustable mounting lug 102 can include a back wall 138 and a mounting extension 140. According to certain embodiments, the adjustable mounting lug 102 can have a unitary construction such that the mounting extension 140 and the back wall 138 are part of a monolithic structure.

According to certain embodiments, the mounting extension 140 has an upper surface 142 and an opposing lower surface 144. Additionally, the mounting extension 140 can include a mounting transition 146 from the back wall 138, and can extend from the mounting transition 146 to an end 148 of the mounting extension 140 in a manner that is generally perpendicular to the back wall 138. Additionally, the mounting extension 140 may, or may not, have a hub 150 that downwardly extends from the lower surface 144. The mounting extension 140 can also include a mounting hole 152 that is configured to matingly engage a fastener that is used to mount an electrical device to the electrical box 100. According to the illustrated embodiment, the mounting hole 152 extends through the upper surface 142 and the lower surface 144 and/or hub 150, and includes an internal thread that can mate an external thread of the fastener. Additionally, a central axis 154 of the mounting hole 152 can be offset from a central axis 156 of the back wall 138 such the mounting hole 152 is linearly offset away from the back wall 138 by a distance that positions the back wall 138 at a location at which the back wall 138 will not interfere with the insertion of the fastener through the mounting hole 152. Further, according to certain embodiments, the central axis 154 of the mounting hole 152 can be generally parallel to at least a front side 158 of the back wall 138.

The back wall 138 includes the front side 158 and an opposing backside 160. Additionally, the back wall 138 can extend between a top wall 162 and an opposing bottom wall 164, as well as between opposing first and second sidewalls 168, 170. As shown in at least FIGS. 2-4, the top and bottom walls 162, 164 can be generally coplanar, or parallel, to each other. The top wall 162 can include, generally in a central location of the top wall 162, a recess 166 that is configured to accommodate placement of the mounting transition 146 and/or the mounting extension 140. As shown by at least FIG. 2, according to certain embodiments, the top wall 162 and the upper surface 142 of the mounting extension 140 can generally be on the same plane. Additionally, as also shown in at least FIG. 2, the top wall 162 has a length between the opposing first and second sidewalls 168, 170 that is longer than a corresponding length of the bottom wall 164 between the opposing first and second sidewalls 168, 170. For example, according to certain embodiments, the top wall 162 can have a length (as indicated by "$L_1$" in FIG. 2) between the opposing first and second sidewalls 168, 170 of about 15 millimeters (mm) to about 20 mm, while the bottom wall 164 can have a length (as indicated by "$L_2$" in FIG. 2) between the opposing first and second sidewalls 168, 170 of about 7 millimeters (mm) to about 11 mm, and, more specifically, around 9 mm to around 10 mm. Additionally, according to certain embodiments, the back wall 138 can have a height (as indicated by "Y" in FIG. 2) between the top wall 162 and the bottom wall 164 of about 6 mm to about 12 mm, and more specifically, from about 7 mm to about 9 mm.

Further, the bottom wall 164 can generally be centered relative to at least the top wall 162 such that the ends of the top and bottom walls 168, 170 can be offset so that the top wall 162 overhangs both the ends of the bottom wall 164. Such differences in length and the associated offsets, as well as the size and shape of the first and second sidewalls 168, 170, can accommodate the formation of first and second extensions or wings 172a, 172b in the back wall 138 that can each be positioned within, as well as rotatable and slideable about, holding tabs 174a, 174b (collectively holding tab 174) of the electrical box 100, as discussed below.

The first and second sidewalls 168, 170 can generally extend between the top wall 162 and the bottom wall 164. Additionally, according to certain embodiments, the first and second sidewalls 168, 170 can have generally similar configurations. Accordingly, while the below description may be provided in terms of one of the first and second sidewalls 168, 170, such description can be equally applicable to the other of the first and second sidewalls 168, 170. Additionally, like reference numbers for each of the first and second sidewalls 168, 170 may refer to similar features for both sidewalls 168, 170.

The first and second sidewalls 168, 170 can, according to certain embodiments, comprise a first portion 184 and second portion 186. The first portion 184 can include a first segment 188 that is coupled to the top wall 162. Further, according to certain embodiments, the first segment 188 is generally perpendicular to the top wall 162. Additionally, the first portion 184 can also include a first transition that connects the first segment 188 to the top wall 162, such as, for example, a radius and/or chamfer, among other types of transitions. Further, the first portion 184 of both the first and second sidewalls 168, 170 can be part of the first and second extensions or wings 172a, 172b.

Figure 2:
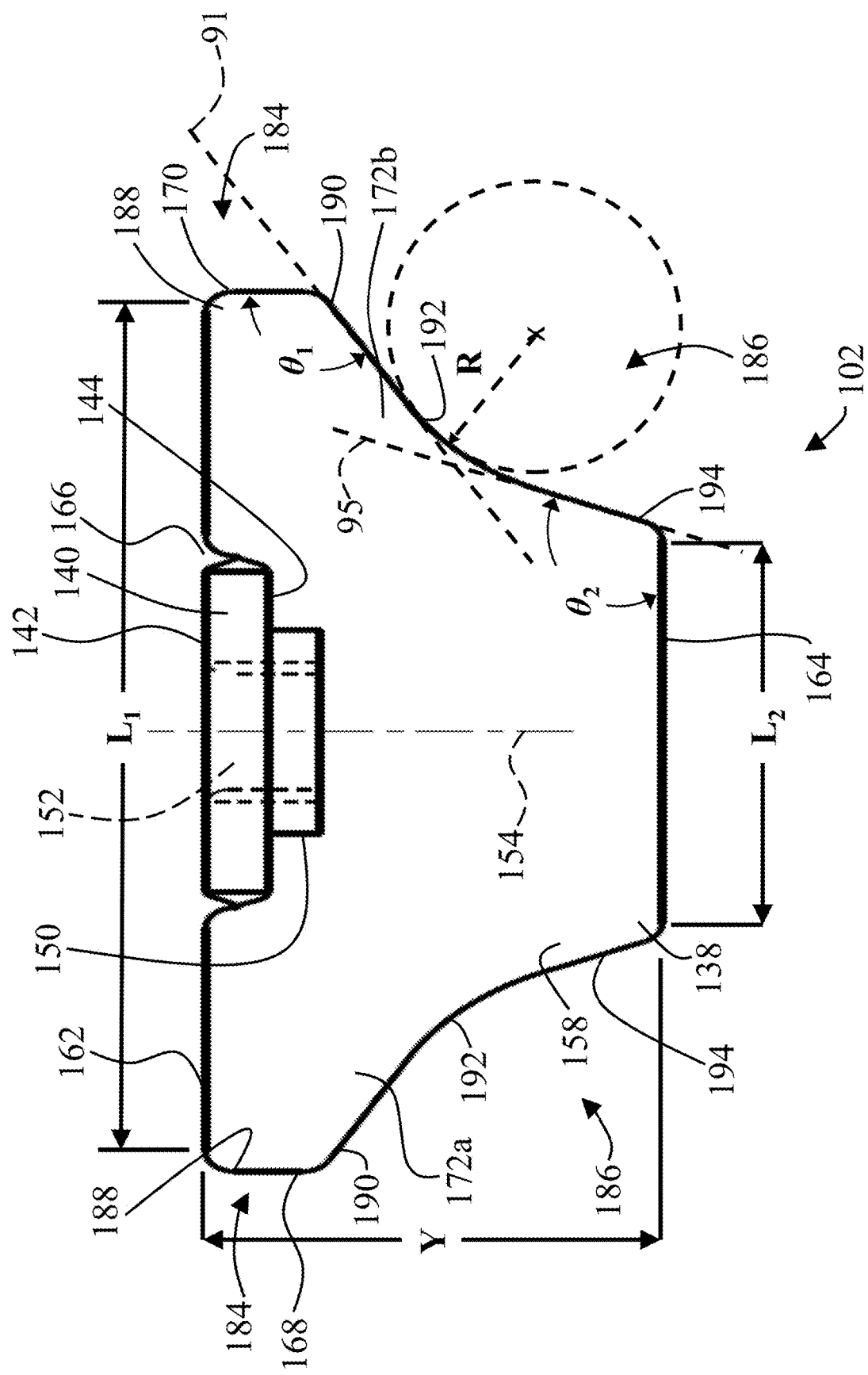
FIG. 2 illustrates a front side of an adjustable mounting lug according to an embodiment of the present application.
Figure 5:
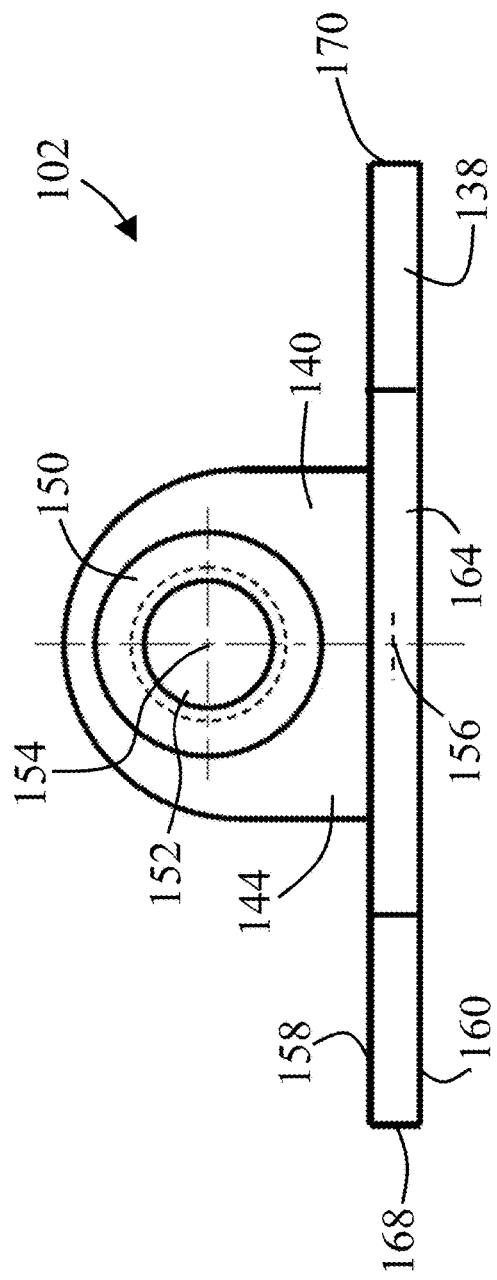
FIG. 5 illustrates a bottom side of an adjustable mounting lug according to an embodiment of the present application.
Figure 6:
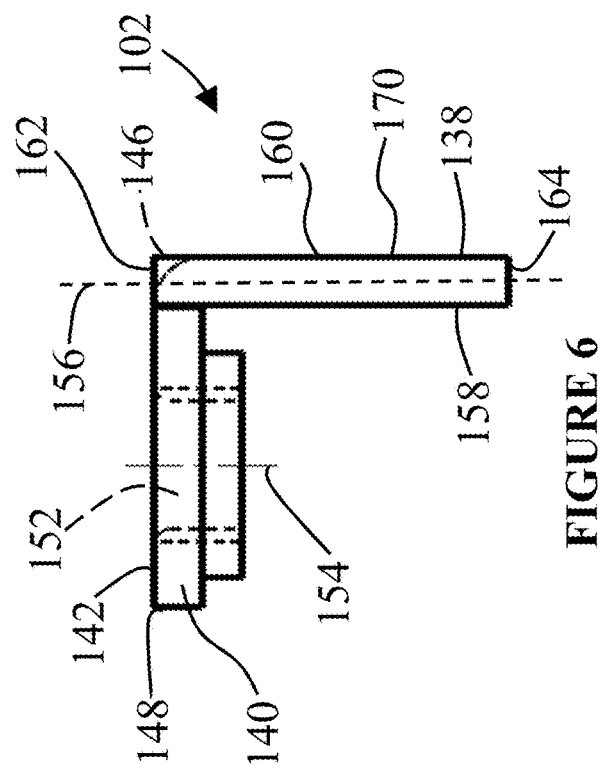
FIG. 6 illustrates a right side of an adjustable mounting lug according to an embodiment of the present application, the left side view being the same as the right side view of the adjustable lug.

The second portion 186 of the first and second sidewalls 168, 170 can generally extend from the adjacent first portion 184 to the bottom wall 164. According to certain embodiments, the second portion 186 can comprise a first inclined side 190, an intermediate curved side 192, and a second inclined side 194. The first inclined side 190 can be connected directly or indirectly to the first segment 188 of the first portion 184. For example, according to certain embodiments, the first inclined side 190 can be connected to the first segment 188 by a second transition, such as, for example, a radius and/or chamfer, among other types of transitions. Additionally, the first inclined side 190 can extend generally inwardly and downwardly from the first segment 188 at a first angle (as indicated by "$\theta_1$" in FIG. 2). According to certain embodiments, the first angle ($\theta_1$) between the first inclined side 190 and the first segment 188 is an obtuse angle. Additionally, similar to the to the first segment 188 of the first portion 184, at least a portion of the first inclined side 190 can provide a portion of the first and second extensions or wings 172a, 172b of the back wall 138. Additionally, according to certain embodiments, the first inclined side 190, or portions thereof, can extend along be a relatively straight line 91 (FIG. 2).

The intermediate curved side 192 can provide a curved transition between the first inclined side 190 and the second inclined side 194. As shown in at least FIGS. 2 and 3, the intermediate curved side 192 is inwardly curved generally in the direction of the central axis 156 of the back wall 138. Such as curved feature of the intermediate curved side 192 and the first and second inclined sides 190, 194 can be configured to at least prevent the adjustable mounting lug 102 from interfering with wiring and cable that may enter into the interior region 118 of the electrical box 100 through a knockout opening 126, including, for example, knockout openings 126 having a relatively large size, including, but not limited to, a diameter of around 25.5 mm.

While the intermediate curved side 192 can have a variety of sizes, according to certain embodiments, the intermediate curved side 192 is an arc of a circle having a radius (as indicated by "R" in FIG. 2) of, for example, but not limited to, around 3 mm to around 5 mm. Additionally, according to certain embodiments, the first inclined side 190 and the second inclined side 194 can be connected to the intermediate curved side 192 at, or generally around, different points at which the first inclined side 190 and the second inclined side 194 are each tangent to the intermediate curved side 192. Thus, the intermediate curved side 192 can provide a transition, or separation, between those tangent points, and thereby provide a separation between the first inclined side 190 and the second inclined side 194. Further, the inclusion of the intermediate curved side 192, and its associated configuration, can facilitate longer contact between the adjustable mounting lug 102 and the adjacent portions of the holding tab 174, which can increase the stability of the adjustable mounting lug 102 in each of the possible linear and rotational positions, and combinations therefore, that the adjustable mounting lug 102 can have when coupled to the electrical box 100 via the holding tab 174.

The second inclined side 194 can be connected directly or indirectly to the bottom wall 164, and can extend to the intermediate curved side 192. For example, according to certain embodiments, the second inclined side 194 can be connected to the bottom wall 164 by a third transition, such as, for example, a radius and/or chamfer, among other types of transitions. Additionally, the second inclined side 194 can extend generally outwardly and upwardly from the bottom wall 164 at a second angle (as indicated by "$\theta_2$" in FIG. 2), and in a direction away from the bottom wall 164 that is generally opposite to the direction at which the first inclined side 190 extends away from the first portion 184. According to the certain embodiments, the second angle ($\theta_2$) between the second inclined side 194 and the bottom wall 164 can be an obtuse angle that may, or may not, be similar to the obtuse angle of the first angle ($\theta_1$). Additionally, similar to the to the first inclined side 190 and the intermediate curved side 192, at least a portion of the second inclined side 194 for each of the first and second sidewalls 168, 170 can provide at least a portion of the first and second extensions or wings 172a, 172b, respectively, of the back wall 138. Additionally, according to certain embodiments, the second inclined side 194, or portions thereof, can extend along a relatively straight line 95 (FIG. 2). Additionally, as shown by at least FIG. 2, the second inclined side 194 may extend along an incline that is different than an incline along which the first inclined surface 190 extends, such the first and second inclined surfaces 190, 194 are non-parallel, and non-perpendicular to each other.

Figure 7:
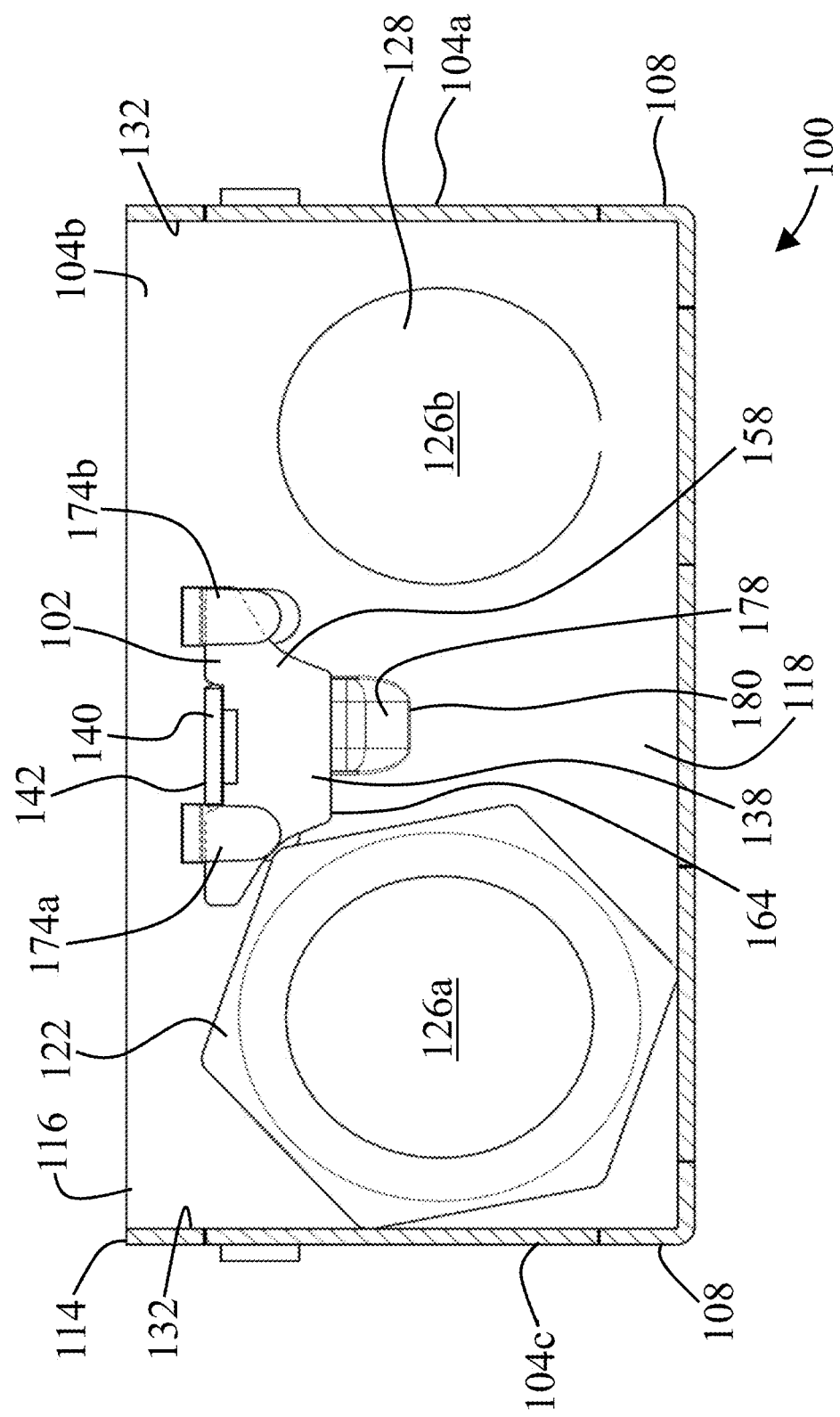
FIG. 7 illustrates a cross-sectional view of the electrical box, as taken along line 7-7 in FIG. 1, and revealing a front view of an adjustable mounting lug according to an embodiment of the present application.
Figure 8:
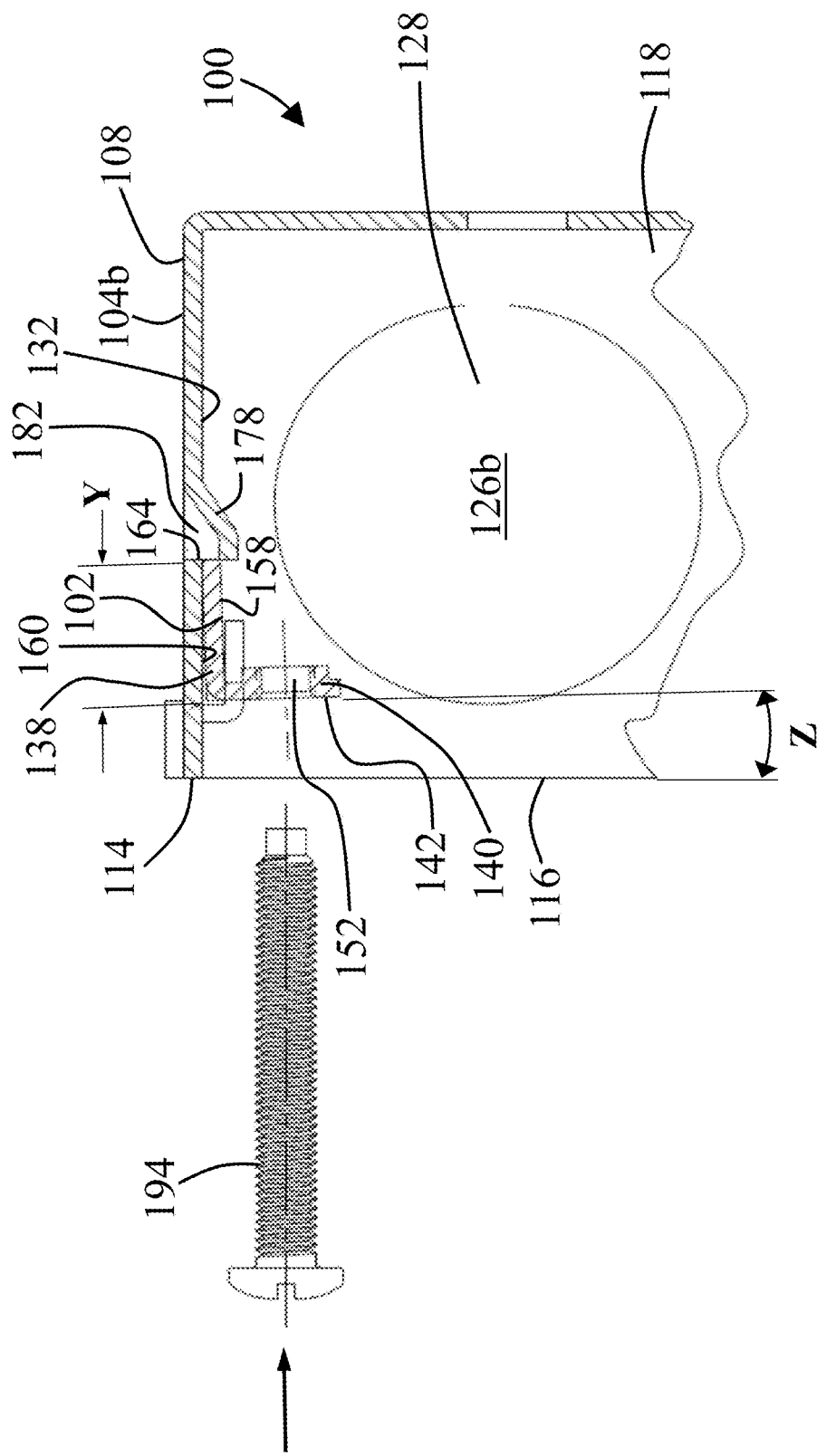
FIG. 8 illustrates a cross-sectional view of the electrical box, as taken along line 8-8 in FIG. 1, and a fastener configured for threaded engagement with a threaded mounting hole in an adjustable mounting lug.

As shown in at least FIGS. 1, 7, and 8, each adjustable mounting lug 102 is secured to the electrical box 100 via use of a pair, or set, of the holding tabs 174a, 174b. The holding tabs 174a, 174b can be partially stamped portions of the sidewalls 104b, 104d that are configured to secure the adjustable mounting lug 102 to the electrical box 100 while also accommodating a degree of linear and rotational displacement of the adjustable mounting lug 102 relative to at least the adjacent sidewall 104b, 104d and/or front face 114 of the electrical box 100. According to the illustrated embodiment, each holding tab 174a, 174b extends from a first end of the holding tab 174a, 174b that is connected to the adjacent sidewall 104b, 104d to a second end of the holding tab 174a, 174b that may not be directly connected to the adjacent sidewall 104b, 104d. The holding tab 174 may also extend into the interior region 118 of the electrical box 100 such that a space 176a, 176b is generally between the holding tab 174 and the adjacent sidewall 104b, 104d that is sized and positioned to accommodate placement of at least a portion of the back wall 138, including, for example, one of the first and second extensions or wings 172a, 172b, as well as accommodate a degree of rotational and linear displacement of the adjustable mounting lug 102 within the space 176a, 176b.

For example, in the embodiment shown in FIG. 1, a first holding tab 174a that is coupled to a sidewall 104b is positioned to accommodate placement of at least a portion of the first extension or wing 172a in the space 176a between the first holding tab 174a and an adjacent portion of the sidewall 104b, while a second holding tab 174b coupled to the same sidewall 104b is positioned to accommodate placement of at least a portion of the second extension or wing 172b in the space 176b between the second holding tab 174b and an adjacent portion of the sidewall 104b. Additionally, the holding tabs 174a, 174b can be spaced apart to accommodate a degree of linear displacement of at least the mounting extension 140 of the adjustable mounting lug 102 between the holding tabs 174a, 174b, while also limiting the degree or distance of such displacement so as to prevent at least the first and second extensions or wings 172a, 172b from becoming disengaged with the associated holding tab 174a, 174b and/or the adjustable mounting lug 102 from being removed from the space 176a, 176b between the holding tab 174a, 174b and the adjacent sidewall 104b, 104d.

The electrical box 100 can also include a support louvre 178 that is positioned and configured to abut the bottom wall 164 of an adjacent adjustable mounting lug 102 at least when the adjustable mounting lug 102 is at certain orientations relative to the adjacent sidewall 104b, 104d, and thereby provide a support for the adjacent adjustable mounting lug 102. Similar to the holding tabs 174a, 174b, according to certain embodiments, the support louvre 178 can be a partially stamped portion of the sidewalls 104b, 104d. Further, a first end 180 of the support louvre 178 can be connected to the sidewall 104b, 104d, while a second, opposing end of the support louvre 178 may not be directly connected to that same sidewall 104b, 104d. Additionally, as shown by at least FIG. 8, the support louvre 178 can extend from the first end 180 of the support louvre 178 in directions generally inwardly into the interior region 118 of the electrical box 100 and upwardly toward the adjustable mounting lug 102. As also shown in FIG. 8, such a configuration results in the formation of a gap 182 generally between the support louvre 178 and the adjacent sidewall 104b, 104d.

By providing the second portion 186 of the first and second sidewalls 168, 170 with the configuration discussed above, and, more specifically, with the first inclined side 190, intermediate curved side 192, and second inclined side 194, the overall height of the adjustable mounting lug 102, and more specifically the height (as indicated by "Y" in FIG. 2) between the top wall 162 and the bottom wall 164, can be increased. Further, such an increase in height can be attained without causing the adjustable mounting lug 102 to have a shape that could interfere with features relating to the knockout opening 126 and associated fittings 120. Further, the inclusion of the second portion 186 allows the bottom wall 164 to maintain a length that promotes both relatively smooth sliding, and continuous engagement, of the bottom wall 164 along/with the support louvre 178.

For example, the bottom wall 164 has a minimum length (as indicated by "L₂" in FIG. 2) so as to accommodate relatively smooth sliding of the bottom wall 164 along the support louvre 178, as well as to prevent the bottom wall 164 from becoming disengaged from the support louvre 178 during linear displacement of the adjustable mounting lug 102 between the holding tabs 174a, 174b. Without such a minimum length, displacement of the adjustable mounting lug 102 between the holding tabs 174a, 174b could result in the bottom wall 164 becoming disengaged with the support louvre 178, which thereby could result in the adjustable mounting lug 102 falling into the gap 182, and possibly being wedged between the support louvre 178 and the adjacent sidewall 104b, 104d. Yet, if the second portion 186 and associated features were not present, attempting to increase the height between the top and bottom walls 162, 164 while maintaining the minimum length of the bottom wall 164 could result in the adjustable mounting lug 102 having a width that would cause the adjustable mounting lug 102 to extend over the knockout openings 126, and/or to a position that would cause the adjustable mounting lug 102 to interfere with portions of associated fittings 120. Moreover, without the above-discussed features of the second portion 186, an increase in the height of the adjustable mounting lug 102 while maintaining the minimum length of the bottom wall 164 would result in an angled sidewall that extends in a generally continuous direction from the top wall 162 to the bottom wall 164. Such a generally continuous sidewall configuration could adversely result in, for at least certain sized knockout openings 126, the adjustable mounting lug 102 at least extending into a position that interferes with the ability to tighten a male bushing 122 of a fitting 120 around the knockout opening 126 and/or against the adjacent sidewall 104b. 104d. The above problems are however alleviated by the inclusion of the second portion 186, and moreover, the combination of the above-discussed first inclined side 190, intermediate curved side 192, and second inclined side 194 which, again, can accommodate an increase in the height of the adjustable mounting lug 102 while maintaining the minimum length of the bottom wall 164 and without the above-discussed interference problems.

Further, by increasing the height of the adjustable mounting lug 102 between the top wall 162 and the bottom wall 164, the degree to which the adjustable mounting lug 102 can be rotated or pivoted about the holding tabs 174a, 174b and relative to at least the front face 114 of the electrical box 100 can be diminished. More specifically, as shown in at least FIG. 8, the adjustable mounting lug 102 can be rotably or pivotally displaced within the space 176a, 176b of the associated holding tabs 174a, 174b from, for example, a location at which at least the upper surface 142 of the mounting extension 140 and/or top wall 162 of the back wall 138 is/are generally parallel to the front face 114 of the electrical box 100, to a inclined position at which at least the upper surface 142 of the mounting extension 140 and/or top wall 162 of the back wall 138 is/are angularly offset relative to the front face by a face angle (as indicated by the angle "Z" in FIG. 8). Moreover, when the adjustable mounting lugs 102 are rotated about their respective holding tabs 174a, 174b, the adjustable mounting lugs 102 can be rotated or pivoted until a portion of the back side 160 of the back wall 138 at or in the vicinity of the bottom wall 164 contacts the adjacent sidewall 104b at a location that prevents further rotation of the adjustable mounting lug 102. By increasing the height of the adjustable mounting lug 102 via the inclusion of the second portion 186 of the first and second sidewalls 168, 170, and moreover, the by inclusion of the above-discussed first inclined side 190, intermediate curved side 192, and second inclined side 194, the back side 160 of the back wall 138 can contact the adjacent sidewall 104b at a location along the adjacent sidewall 104b that further away from at least the respective holding tabs 174a, 174b than may otherwise be attained by other designs. By increasing the distance between at least the holding tabs 174a, 174b and the location at which the back side 160 of the back wall 138 contacts the adjacent sidewall 104b so as to prevent rotation of the adjustable mounting lugs 102, such rotation of the adjustable mounting lugs 102 is stopped sooner during rotation of the adjustable mounting lugs 102 than may otherwise be attained with a shorter adjustable mounting lug. Consequently, the degree of rotation, or play, in the movement of the adjustable mounting lug 102 can be diminished, such as, for example, to a face angle of about 1 degree to about 3 degrees, among other angles.

Such diminishing in the degree of rotation of the adjustable mounting lugs 102 about their respective holding tabs 174a, 174b can also diminish the extent the central axis 154 of the mounting hole 152 is angularly displaced away from being generally perpendicular to the front face 114 of the electrical box 100. By diminishing the degree of such angular displacement of the central axis 154 of the mounting hole 152, the likelihood of the mating fastener 194 being misaligned with the central axis 154 of the mounting hole 152 to an extent that may facilitate stripping or other excessive wear or damage to the internal threads of the mounting hole 152 may be reduced.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An apparatus comprising:
  a mounting extension having a mounting hole; and
  a back wall attached to the mounting extension, the back wall having a top wall, a bottom wall, a first sidewall, and a second sidewall, the back wall extending in a direction from the bottom wall to the top wall that is generally perpendicular to a direction that the mounting extension extends away from the back wall, the mounting extension extending from a recess that is positioned between opposing portions of the top wall, the first and second sidewalls extending between the top wall and the bottom wall, the first and second sidewalls further comprising a first inclined side, an intermediate curved side, and a second inclined side, the intermediate curved side being a curved surface that is positioned between the first and second inclined side, and wherein the first inclined side extends along an incline that is different than an incline about which the second inclined side extends.

2. The apparatus of claim 1, wherein the curved surface of the intermediate curved side is a segment of a circular shape that is inwardly curved into the back wall, and wherein the recess is positioned at a central location along the top wall.

3. The apparatus of claim 2, wherein the first inclined side and the second inclined side are each tangent to the intermediate curved side.

4. The apparatus of claim 1, wherein the first and second sidewalls each also include a first segment, the first segment being positioned between the first inclined side and the top wall.

5. The apparatus of claim 4, wherein the first segment is perpendicular to the top wall, and wherein the first inclined side extends from the first segment at an obtuse angle.

6. The apparatus of claim 1, wherein the second inclined side extends from the bottom wall at an obtuse angle.

7. The apparatus of claim 1, wherein the apparatus has a height between the top wall and the bottom wall of about 7 mm to about 9 mm, and wherein the top wall is coplanar with an upper surface of the mounting extension, the mounting hole extending through the upper surface of the mounting extension.

8. The apparatus of claim 1, wherein the mounting extension is perpendicular to the back wall, and wherein the mounting hole extends through a hub that outwardly extends from a lower surface of the mounting extension.

9. An apparatus comprising:
  a mounting extension having an upper surface, a lower surface, and a mounting hole, the mounting hole having an internal thread; and
  a back wall attached to the mounting extension, the back wall having a top wall, a bottom wall, a first sidewall, and a second sidewall, the back wall extending in a direction from the bottom wall to the top wall that is different than a direction that the mounting extension extends away from the back wall and which is parallel to a central axis of the mounting hole, the first and second sidewalls each having a first portion and a second portion, the first portion comprising a first segment, the second portion comprising a first inclined side, an intermediate curved side, and a second inclined side, the intermediate curved side being positioned between the first and second inclined sides, and wherein the first inclined side extends in a direction different than the first segment and along an incline that is different than an incline about which the second inclined side extends.

10. The apparatus of claim 9, wherein the upper surface of the mounting extension is generally parallel to the top wall.

11. The apparatus of claim 9, wherein the intermediate curved side is an inwardly curved surface that extends generally toward a central axis of the back wall, and wherein the mounting extension extends from a recess along the top wall.

12. The apparatus of claim 11, wherein the first inclined side extends along a generally straight first line that intersects, and is non-perpendicular to, a generally straight second line along which the second inclined side extends.

13. The apparatus of claim 12, wherein the first line and the second line are both tangent to the intermediate curved side.

14. The apparatus of claim 13, wherein the first segment is perpendicular to the top wall.

15. An apparatus comprising:
  a mounting extension having a mounting hole, the mounting hole extending along a first central axis; and
  a back wall attached to the mounting extension and extending between a top wall and a bottom wall of the back wall along a second central axis that is parallel to, and offset from, the first central axis, the mounting extension extending away from a recess in the back wall at a location that is adjacent to the top wall and in a direction that is perpendicular to the second axis, the back wall further having a first sidewall and a second sidewall, the first sidewall comprising a first wing, the second sidewall comprising a second wing, the first wing and the second wing each having:
  a first segment connected to the top wall, the first segment being generally perpendicular to the top wall;
  a first inclined surface connected to the first segment, the first inclined surface extending away from the first segment at a first obtuse angle;
  an intermediate curved side connected to the first inclined surface, the intermediate curved side being inwardly curved into the back wall; and a second inclined surface connected to both the intermediate curved side and the bottom wall, the second inclined surface extending away from the bottom wall at a second obtuse angle.

16. The apparatus of claim 15, wherein the first obtuse angle is different than the second obtuse angle.

17. An apparatus comprising:
a mounting extension having:
  a mounting hole, the mounting hole extending along a first central axis; and
  a back wall attached to the mounting extension and extending along a second central axis that is parallel to, and offset from, the first central axis, the back wall having a top wall, a bottom wall, a first sidewall, and a second sidewall, the first sidewall comprising a first wing, the second sidewall comprising a second wing, the first wing and the second wing each having:
    a first segment connected to the top wall, the first segment being generally perpendicular to the top wall;
    a first inclined surface connected to the first segment, the first inclined surface extending away from the first segment at a first obtuse angle;
    an intermediate curved side connected to the first inclined surface, the intermediate curved side being inwardly curved into the back wall; and
    a second inclined surface connected to both the intermediate curved side and the bottom wall, the second inclined surface extending away from the bottom wall at a second obtuse angle, and
an electrical box having a plurality of sidewalls and a plurality of holding tabs, an end portion of the plurality of sidewalls forming a front face about an opening into an interior region of the electrical box, and wherein at least a first holding tab of the plurality of holding tabs is positioned about a first sidewall of the plurality of sidewalls and is configured to receive the first wing in a first space between the first holding tab and the first sidewall, and at least a second holding tab of the plurality of holding tabs is positioned about the first sidewall and is configured to receive the second wing in a second space between the second holding tab and the first sidewall.

18. The apparatus of claim 17, wherein the first space is sized to accommodate both linear displacement and rotational displacement of the first wing in the first space, and wherein the second space is sized to accommodate both linear displacement and rotational displacement of the second wing in the second space.

19. The apparatus of claim 18, wherein the back wall has a height between the top wall and the bottom wall that accommodates about 1 degree to about 3 degrees rotational displacement of the mounting extension relative to the front face of the electrical box before the back wall contacts the adjacent sidewall in a manner that precludes further rotational displacement of at least the mounting extension.

20. The apparatus of claim 19, wherein an upper surface of the mounting extension is approximately parallel to the front face of the electrical box when the second central axis is parallel to the adjacent sidewall and the first wing is positioned in the first space and the second wing is positioned within the second space.

* * * * *